US006296427B1

(12) United States Patent
Potter et al.

(10) Patent No.: US 6,296,427 B1
(45) **Date of Patent: *Oct. 2, 2001**

(54) TWO SPEED RIGHT ANGLE DRILL

(75) Inventors: Christine H. Potter, Perry Hall, MD (US); Todd A. Hagan, Windsor, PA (US); Rodney D. Milbourne, Abingdon; Robert B. Williams, Baltimore, both of MD (US)

(73) Assignee: Black & Decker Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/591,396

(22) Filed: Jun. 9, 2000

Related U.S. Application Data

(63) Continuation of application No. 09/257,715, filed on Feb. 25, 1999, now Pat. No. 6,102,632, which is a continuation of application No. 09/065,634, filed on Apr. 23, 1998, now abandoned.

(51) Int. Cl.[7] .................................................. B23B 45/02

(52) U.S. Cl. ............................ 408/124; 173/217; 310/50

(58) Field of Search .................................... 408/124, 139; 310/47, 50; 74/421 A, 523; 475/299; 173/217

(56) References Cited

U.S. PATENT DOCUMENTS

| | | | | |
|---|---|---|---|---|
| 2,155,082 | * | 4/1939 | Decker | 408/124 |
| 2,273,626 | | 2/1942 | Connell . | |
| 3,244,030 | * | 4/1966 | Godfrey | 408/124 |
| 3,257,877 | | 6/1966 | Ulrich et al. . | |
| 3,452,226 | * | 6/1969 | Hettich | 408/124 |
| 3,602,318 | * | 8/1971 | Slany | 408/124 |
| 4,366,871 | | 1/1983 | Dieterle et al. . | |
| 4,974,475 | | 12/1990 | Lord et al. . | |
| 5,404,775 | | 4/1995 | Abe . | |
| 5,449,043 | | 9/1995 | Bourner et al. . | |
| 6,102,632 | * | 8/2000 | Potter et al. | 408/124 |

FOREIGN PATENT DOCUMENTS

| | | | | |
|---|---|---|---|---|
| 385595 | | 11/1923 | (DE) . | |
| 2158118 | | 5/1973 | (DE) . | |
| 7629644 | | 1/1977 | (DE) . | |
| 3234571 | | 4/1983 | (DE) . | |
| 83 25 334 U | | 11/1983 | (DE) . | |
| 32 30 648 C2 | | 6/1984 | (DE) . | |
| 3525208 | * | 1/1986 | (DE) | 408/124 |
| 41 16 343 A1 | | 11/1992 | (DE) . | |
| 44 41 258 A1 | | 5/1996 | (DE) . | |
| 71356 | | 2/1983 | (EP) . | |
| 321594 | | 6/1989 | (EP) . | |
| 288909 | * | 12/1986 | (JP) | 408/124 |
| 1523327 A1 | | 11/1989 | (SU) . | |

OTHER PUBLICATIONS

Milwaukee Electric Tool Corporation, ISO 9001 Certified, Catalog 1997, Milwaukee Heavy Duty Electric Tools for Contractors and Industry.

Hitachi Power Tools, Cordless Tools excerpt, Litho in USA, Order EP9010 (6/97–25).

Makita ISO 9002 Certified, 1997 Pocket Catalog.

* cited by examiner

*Primary Examiner*—Daniel W. Howell
(74) *Attorney, Agent, or Firm*—Harness, Dickey & Pierce, P.L.C.

(57) ABSTRACT

A drill (10) has a housing (12) with a motor (14) which includes an output pinion (104) which defines an axis (102). A power source (16) is coupled with the motor (14). An activation device (44) energizes and de-energizes the motor (14). As the motor (14) is activated, an output (18), which is coupled with the motor (14) is driven. The output (18) defines an output axis (156) which is substantially perpendicular to the motor axis (102). A transmission (20) is coupled between the motor (14) and the output (18). The transmission (20) changes speed and torque of the output (18) between at least two different settings.

25 Claims, 4 Drawing Sheets

TWO SPEED RIGHT ANGLE DRILL

This is a continuation of U.S. patent application Ser. No. 09/257,715 filed Feb. 25, 1999, now U.S. Pat. No. 6,102,632 which is a continuation of application Ser. No. 09/065,634 filed Apr. 23, 1998, now abandoned.

BACKGROUND OF THE INVENTION

The present invention relates to drill motors. More particularly, the present invention relates to right angle drill motors.

Professional carpenters, such as cabinet makers, and sheet metal workers, such as HVAC tradesmen, often work in tight or cramped locations. Ordinarily, these craftsmen are driving small screws into workpieces. As a result, it is desirable to have a drill with a small, compact shape, which is light and is convenient to operate. Thus, the craftsman can optimally and efficiently utilize the drill.

Right angle drills exist which are lightweight and generally compact. However, these drills are limited in torque and do not possess good overall ergonomics. These drills are generally single speed and include small motors and battery packs. Ordinarily, the small battery packs limit the battery packs to lower voltages such as 9.6 or 12 volts. Some of the drills include circuit breakers to prevent damage to the motor under excessive loads. Further, these right angle drills do not enable change of torque or speed to drive the screws into the workpiece.

SUMMARY OF THE INVENTION

Accordingly, it is an object of the present invention to provide an improved right angle drill which has a transmission or gear box which provides two speeds. A high speed setting provides low torque at high speeds while a low speed setting provides high torque at low speeds.

Accordingly, tne user can select a speed and torque setting best suited for the application. Further, the user may adjust the speed and torque setting during the application without removing the drill from the screw.

In accordance with a first aspect of the invention, a drill comprises a housing with a motor in the housing. A drive element is coupled with the motor and is on an axis defined by the motor shaft. A power source is coupled with the motor. An activation device is coupled with the motor to energize and de-energize the motor. Also, an output is coupled with the motor drive element. The output defines a second axis which is perpendicular to the motor axis. A transmission is coupled between the motor drive element and the output. The transmission changes speed and torque of the output between at least two different settings. Preferably, the transmission is a manual two-speed transmission. Ordinarily, the transmission is a two-stage planetary gear train and a bevel gear set, one of the bevelled gears coupling with the output. An activation member is on the housing to move the transmission between different settings which, in turn, provides the different speeds and torque. The activation member may be positioned in numerous locations on the housing such that the transmission activation member and the motor activation member can be activated by the user using the same hand. Further, the housing includes at least three distinct handle positions. Each handle position enables access to the motor activation member to energize or de-energize the motor. The motor activation device is an elongated paddle switch which may be activated by a plurality of fingers on the user's hand.

In accordance with a second aspect of the invention, a right angle drill comprises a housing with a motor in the housing. The motor is coupled with power source. An activation member is coupled with the motor to energize and de-energize the motor. An output is coupled with the motor. A transmission is coupled between the motor and the output to provide a plurality of speeds and torque to the output. A second activation member is on the housing. The second activation member enables changing of the speed and torque setting of the output. The second activation member is coupled with the transmission and positioned on the housing such that the first and second activation members are operable by the same hand of the user. The housing includes a top portion, bottom portion, and two side portions. The second activation member may be positioned on any one of the portions so that the first activation member, as well as the second activation member, can be activated by one hand. The housing includes at least three distinct handle positions. The motor activation member is operable from each of the three distinct handle positions. The motor activation device is an elongated paddle switch which is able to be activated by a plurality of fingers.

In a third aspect of the invention, a right angle drill comprises a housing with a motor in the housing coupled to a power source. An output is coupled with the motor. An activation member is coupled with the motor to energize and de-energize the motor. The housing includes at least two distinct handle portions. The activation member is operable from each of the handle portions. The activation device is an elongated paddle switch which is able to be activated by one to a plurality of fingers. A transmission is coupled between the output and the motor to change speed and torque of the output. The transmission is a two-speed manual transmission with an activation member on the housing to move the transmission between different settings. The transmission is ordinarily a two-stage planetary gear train with a bevel gear set. One of the bevel gears is coupled with the output. The housing includes a top portion, a bottom portion and side portions. The transmission activation member can be positioned on any of the portions. In the use position, the motor activation device and the transmission activation member can be activated by the same hand of the user.

Other objects, features and advantages of the present invention will become more fully apparent from the following detailed description of the preferred embodiment and the accompanying drawings.

DETAILED DESCRIPTION OF THE PREFERRED EMBODIMENT

Figure 1:
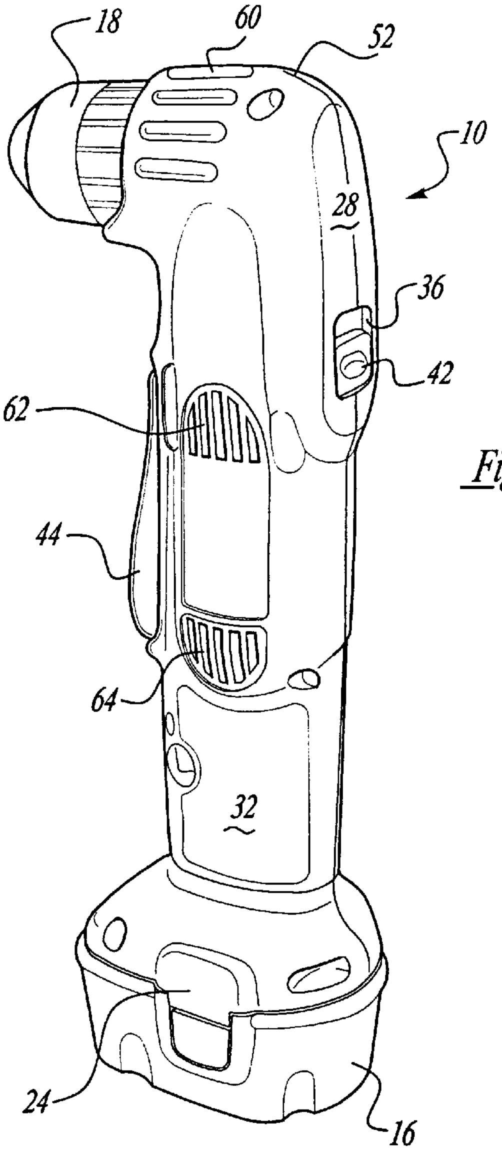
FIG. 1 is a rear perspective view of a drill in accordance with the present invention.

Turning to the figures, particularly FIG. 1, a right angle drill is illustrated and designated with the reference numeral 10. The drill includes a housing 12 with a motor 14 within the housing 12. The motor 14 is energized by a power source 16 with a rechargeable battery shown. However, the battery could be replaced with a cord to deliver AC power to the motor. An output 18 such as a chuck is driven by the motor 14 via a transmission or gear box 20.

The housing 12 includes an opening 22 to receive the battery 16. A pair of receiving elements 24 and 26 are on the housing to secure the battery 16 within the housing 12. The housing 12 has a top portion 28, a bottom portion 30, and side portions 32 and 34. The housing includes apertures 36, 38 and 40 which enable the transmission activation switch 42, the motor activation member 44, and the chuck 18 to extend inside the housing 12 to be coupled with the motor 14.

Figure 2A:
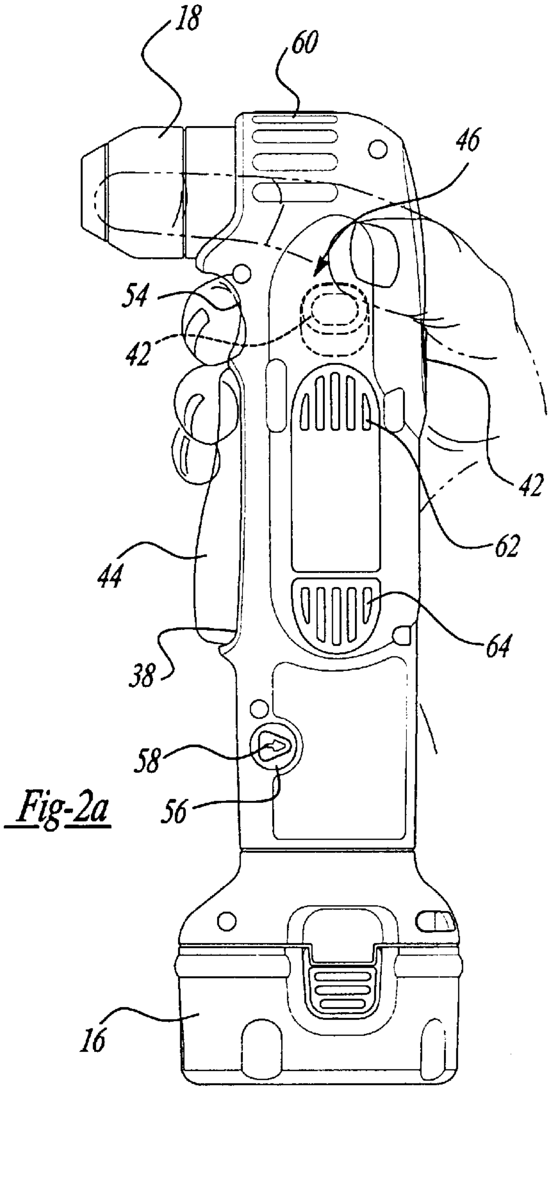
FIG. 2*a* is a side view of FIG. 1 with a hand on the drill in a first handle position.
Figure 2B:
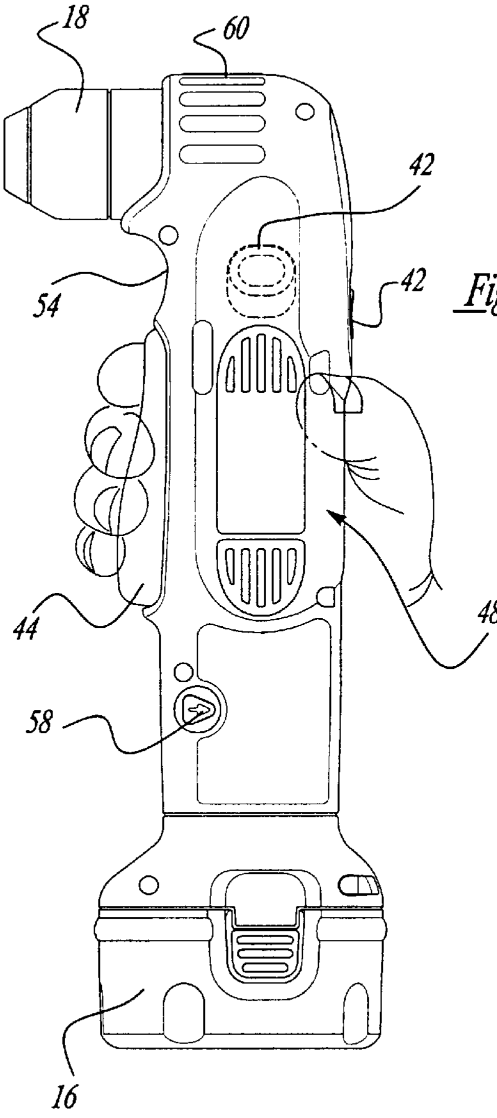
FIG. 2*b* is a view like FIG. 2*a* with a hand in a second handle position.
Figure 2C:
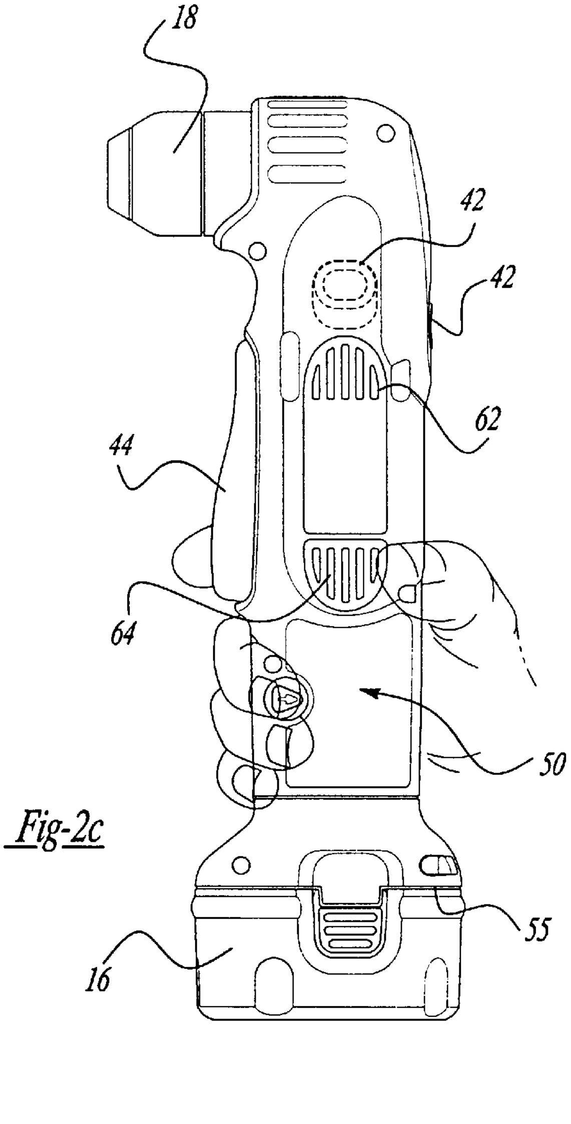
FIG. 2*c* is a view like FIG. 2*a* with a hand on the drill in a third handle position.
Figure 3:
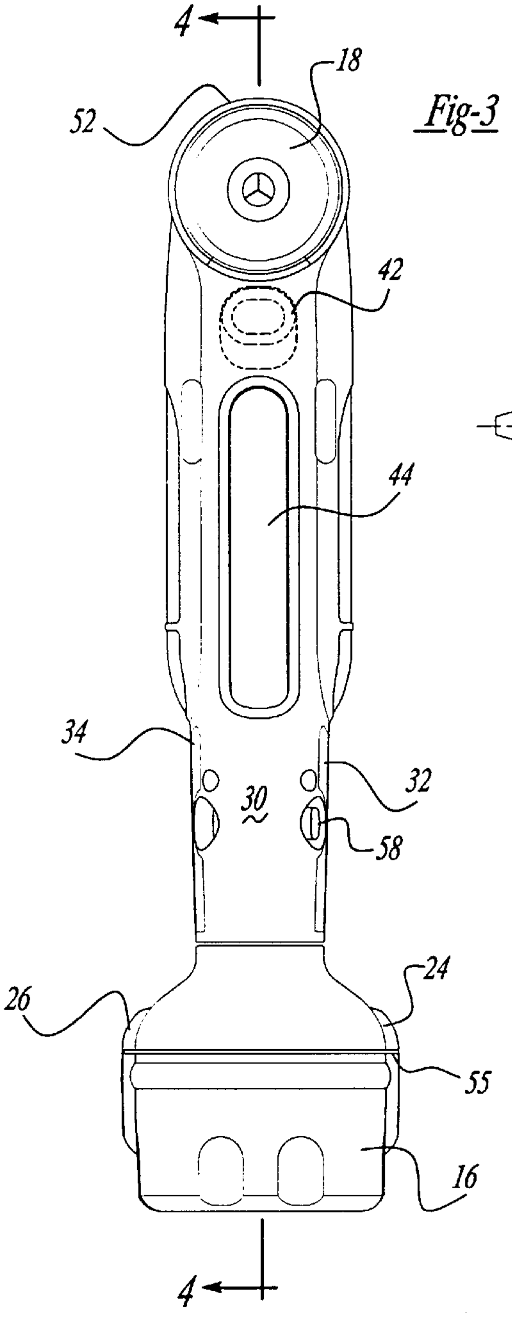
FIG. 3 is a front elevation view of the drill of FIG. 1.

Turning to FIGS. 2*a*–2*c*, the housing includes three distinct handle portions 46, 48 and 50. Handle portion 46 is near the output or chuck end 52 of the housing and includes a finger cut-out 54. Thus, as seen in FIG. 2*a*, the user grips the first handle portion 46 with his index finger along the output axis and his middle finger in cut-out 54 and the remaining two fingers on the paddle switch 44. Also, the user's thumb is able to work the manual transmission activation switch 42. Thus, the user's hand is directly behind the output applying force along the output axis.

The second handle portion 48 is near the middle of the housing 12.

The handle portion 48 enables the user to grip the drill 10 with all four fingers on the paddle switch 44 as illustrated in FIG. 2*b*. Here, the user may activate the manual transmission activation switch 42 with his index finger.

The third handle portion 50 is near the battery end 55 of the housing 12. The handle portion 50 enables the user to grasp the housing with his index finger on the paddle switch 44 as illustrated in FIG. 2*c*. Thus, the housing provides three distinct handle portions which enable the user to activate the motor paddle switch 44 at each of the three handle positions, thus providing versatility to the drill housing 12.

The housing further provides an aperture 56 for the motor direction switch 58. The switch 58 can be moved from side to side which, in turn, provides clockwise and counter-clockwise rotation of the motor. Also, the switch 58 is provided with a neutral position which, in the neutral position, prohibits the paddle switch 44 from being activated.

The transmission activation switch 42, while illustrated on the top 28 of the housing, may be positioned on either side 32 or 34 or on the bottom 30 near the cut-out 54. The side and bottom positions of the transmission activation switch 42 on the housing are illustrated in phantom in FIGS. 2*a*–2*c* and 3.

The housing includes design bumps 60. The housing also includes slits 62 and 64, which provide air passage between ambient and the motor 14 to cool the motor.

Figure 4A:
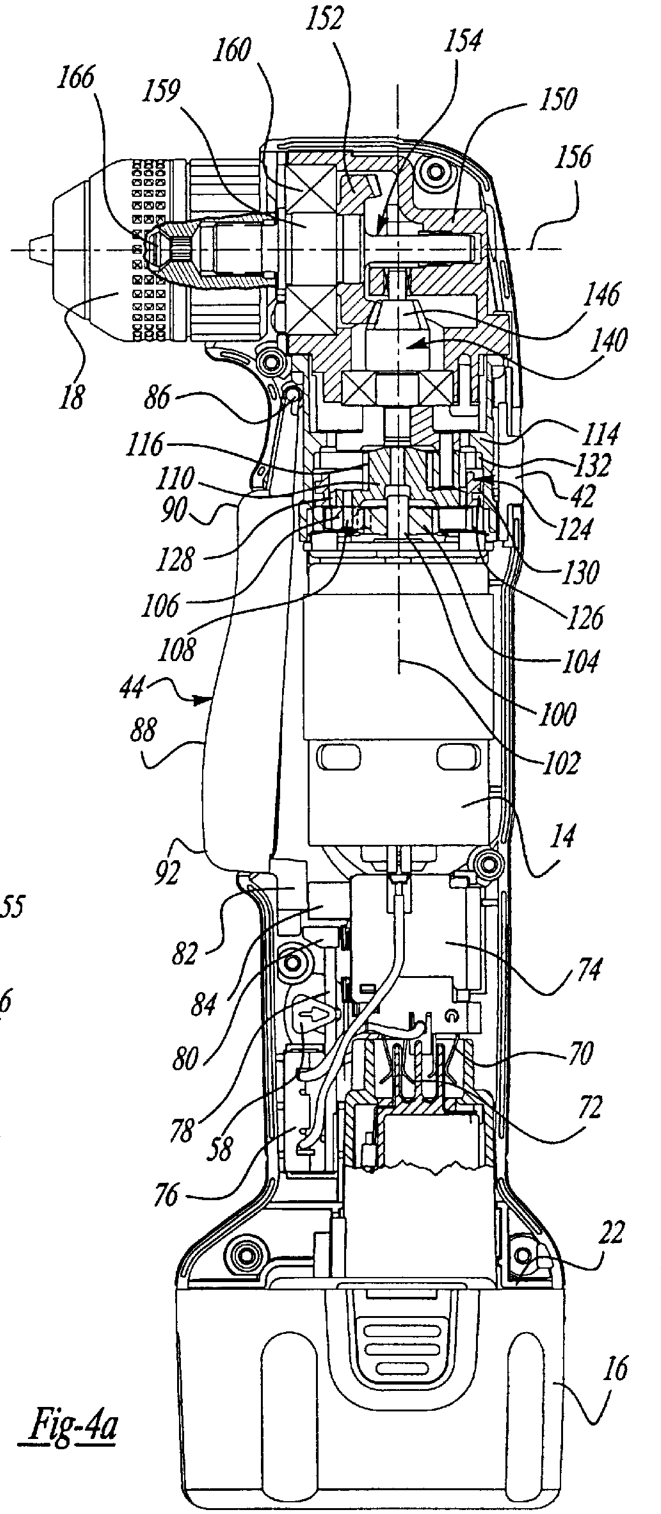
FIG. 4*a* is a cross-section view of FIG. 3 along line 4—4 with the transmission activation member in a first setting position.
Figure 4B:
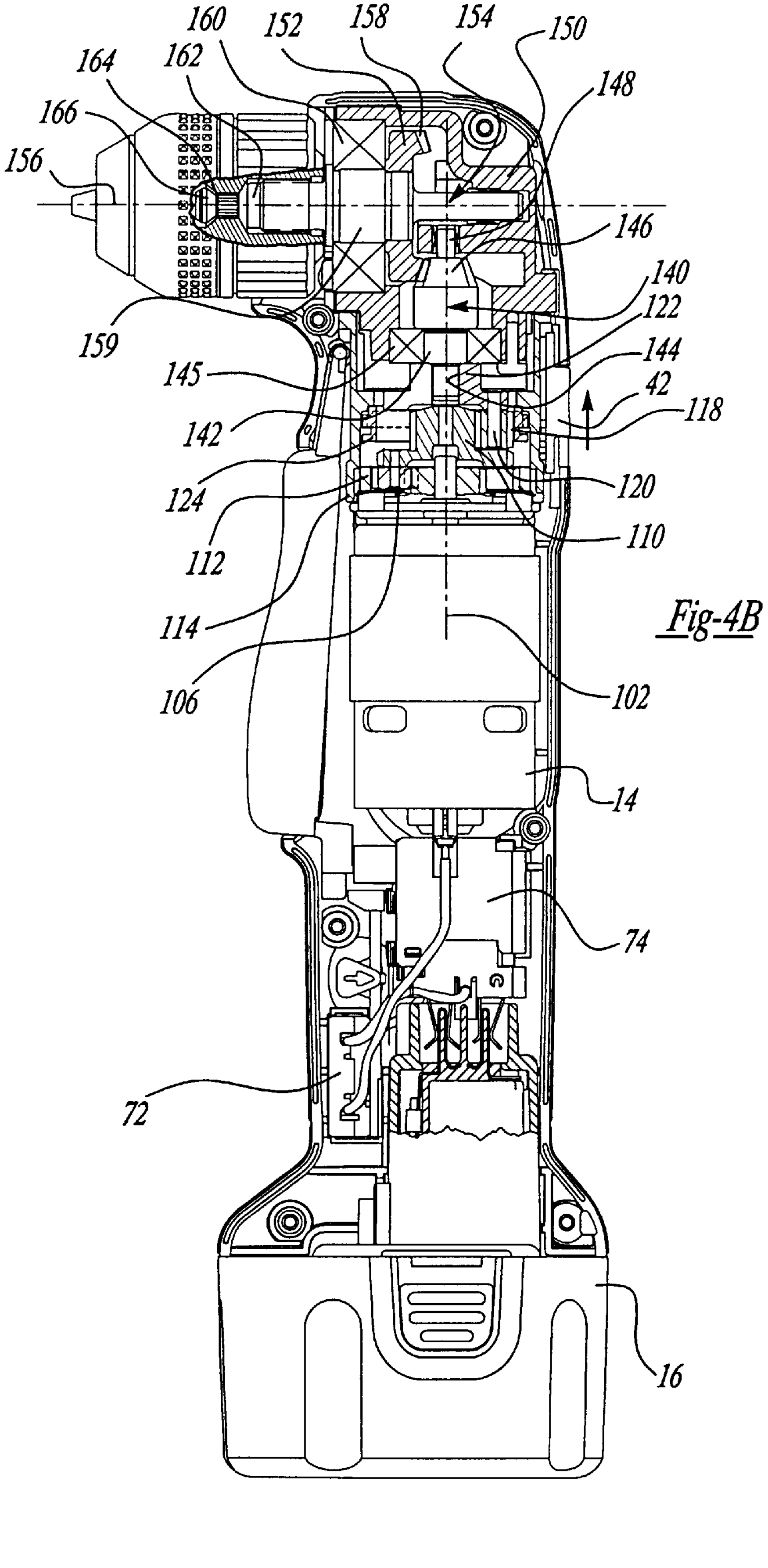
FIG. 4*b* is a view like FIG. 4*a* with the transmission activation member in a second setting position.

The battery 16 is coupled with electrical connectors 70 and 72 as illustrated in FIGS. 4*a* and 4*b*. The electrical connectors 70 and 72 are electrically coupled with energizing switch mechanism 74. The switch mechanism 74 is electrically coupled with the directional switch 76 both, in turn, are electrically coupled with the motor 14. The directional switch 76 includes push button switch 58 which is coupled to a lever 78. Lever 78 includes head 80 which, in the neutral position, as shown, blocks the end 82 of the paddle switch 44 prohibiting the paddle switch from moving inward to activate the motor.

The electrical switch 74 includes push button 84 which is activated by the end of the paddle switch 44.

The paddle switch 44 is secured to the housing 12 via a pivot 86. Thus, the paddle switch 44 is pivoted on the housing and includes an end 82 which activates push button 84 of energizing switch 74. The paddle switch 44 has an arcuate outer surface 88 which is concave towards front end 90 and is convex towards the rear end 92. These concave and convex portions provide an ergonomical grip to enable the user's fingers to comfortably be positioned on the paddle switch 44 as illustrated in FIGS. 2*a*–2*c*.

The motor 14 includes a shaft 100 which defines an axis 102. The motor shaft 100 includes a pinion gear 104. Thus, when the motor 14 is energized, the pinion gear 104 rotates either clockwise or counter-clockwise depending upon the position of the directional switch 76.

The gear box or transmission 20 includes a first stage of planet gears 106 meshing with the pinion gear 104. The planet gears 106 are journalled for rotation about their axes 108 on a first stage carrier 110. A planet ring 112 is fixed in the transmission housing 114. The planet ring 112 has internal gear teeth which mesh with the planet gears 106. Thus, as the pinion gear rotates the planet gears 106, they in turn are obliged to rotate about the motor axis 102 running around the planet ring 112. In so doing, the first stage carrier 110 rotates about the axis 102 at some speed less than the speed of rotation of the pinion gear 104. Hence, a first speed reduction is achieved.

The first stage carrier 110 includes its own spur gear 116 driving a second stage of planet gears 118. The planet gears 118 are likewise journalled for rotation about their own axes 120 on a second stage carrier 122. A second stage planet ring 124 has internal gear teeth for meshing with the second stage planet gears 118.

However, the second planet ring 124 has two axial positions or settings to provide different results. The planet ring 124 has an external circumferential groove 126 into which project fingers (not shown) of the transmission actuation switch 42 in order to shift the planet ring 124 between its two positions when the transmission activation switch 42 is operated.

In the position shown in FIG. 4*a*, the ring 124 is in its high speed/low torque position where its gear teeth mesh with teeth 128 formed around the outside of the first stage carrier 110. Thus, the second planet ring 124 is locked on the first stage carrier 110 and rotates with it. Accordingly, the planet gears 118 do not rotate about their own axes, but merely transmit the rotation of the first stage carrier 110 directly to the second stage carrier 122 with no speed reduction.

If, however, the ring 124 is shifted leftwardly as illustrated in FIG. 4*b* to its low speed/high torque position, its gear teeth are disengaged from the teeth 128 of the first stage carrier 110. However, on disengagement from teeth 128, teeth 130 on the outside of the second planet ring 124 engage corresponding teeth 132 in the transmission housing 114 so as to lock the second planet ring 124 in the housing 114. Now, not only are the second planet gears 118 free to rotate about their axes 120, they are positively obliged to by their engagement with the teeth of the now stationary second planet ring 124. Thus, the planet gears 118 also orbit around axis 102 transmitting reduced speed drive to the second stage carrier 122.

The second stage carrier 122 is coupled with a first member 140 of a bevel gear set. The first member 140 includes a stepped shaft 142 which is fixed in an aperture 144 of the second stage carrier 122. Thus, the first member 140 rotates with the carrier 122. A bearing 145 is positioned around the shaft 142. The member 140 includes a first bevel gear 146. Also, a shaft portion 148 projects from the first member 140 beyond the bevel gear 146 and is journalled in the housing 150 to balance the member 140 and provide smooth rotation of the member 140.

A second bevel gear 152 of the bevel set is coupled with an output spindle 154. Thus, teeth 156 of the first bevel gear mesh with teeth 158 of the second bevel gear to drive the output spindle 154. The output spindle 154 defines an axis 156 which is substantially perpendicular to the motor axis 102. The output spindle 154 includes a stepped shaft 159 having a smaller diameter portion which is journalled in the housing 150. A bearing 160 is positioned on the shaft 159 to balance the rotation of the output spindle 154. The end 162 of the output spindle 154 includes an aperture 164 to receive a fastener 166 which maintains the output or chuck 18 on the output spindle 154. Thus, as the motor rotates, drive is transmitted through the transmission 20 to the output spindle 54 and, in turn, to the output or chuck 18. The axial rotation of the motor being moved ninety (90°) degrees by the bevel gear set to the output spindle.

While the above detailed description describes the preferred embodiment of the present invention, the invention is susceptible to modification, variation, and alteration without deviating from the scope and fair meaning of the subjoined claims.

What is claimed is:

1. A drill comprising:

a housing;

a motor in said housing, said motor having a drive element, said drive element defining an axis of said motor;

a power source for energizing said motor;

an activation device for energizing and de-energizing said motor;

an output coupled with said motor drive element, said output defining an output axis, said output axis being substantially angled with respect to said motor axis; and a transmission coupled between said motor drive element and said output, said transmission changing speed of said output between at least two different speeds.

2. The drill according to claim 1, wherein said transmission being manual.

3. The drill according to claim 2, wherein said transmission is a two-speed transmission.

4. The drill according to claim 2, wherein a transmission activation member is on said housing for moving said transmission between different setting positions.

5. The drill according to claim 4, wherein said housing has a top portion, bottom portion, and two side portions and said transmission activation member being on one of said portions.

6. The drill according to claim 2, wherein said motor activation device and said transmission activation member can be activated by a single hand of a user.

7. The drill according to claim 1, wherein said housing has at least three distinct handle positions enabling activation of said motor activation device at each handle position.

8. The drill according to claim 1, wherein said transmission has a two stage planetary gear train and a bevel gear set, one bevel gear of said bevel gear set coupling with said output.

9. The drill according to claim 1, wherein said activation device being an elongated paddle switch being able to be activated by a plurality of fingers.

10. An angled drill, comprising:

a housing;

a motor in said housing, said motor coupled with a power source;

an activation member for energizing and de-energizing said motor;

an output coupled with said motor;

a transmission coupled between said motor and said output for providing a plurality of different speeds to said output;

a second activation member for changing the speed of said output, said second activation member coupled with said transmission and said second activation member in close proximity to said first activation member, enabling one hand operation of said activation members.

11. The angled drill according to claim 10, wherein said housing has a top portion and said second activation member being on said top portion.

12. The angled drill according to claim 10, wherein said housing has a bottom portion and said second activation member being on said bottom portion.

13. The angled drill according to claim 10, wherein said housing has a side portion and said second activation member being on said side portion.

14. The angled drill according to claim 10, wherein said housing has at least three distinct handle positions enabling activation of said motor activation device at each handle position.

15. The angled drill according to claim 10, wherein said activation device being an elongated paddle switch being able to be activated by a plurality of fingers.

16. An angled drill comprising:

a housing;

a motor in said housing, said motor including a power source;

an output coupled with said motor;

an activation member for energizing and de-energizing said motor; and a plurality of handle positions on said housing, said activation member being operated from each of said handle positions.

17. The angled drill according to claim 16, wherein said housing having three distinct handle portions, said activation member operable from each of said handle portions.

18. The angled drill according to claim 16, wherein said activation device being an elongated paddle switch being able to be activated by a plurality of fingers.

19. The angled drill according to claim 16, wherein a transmission is coupled between said output and said motor for changing speed of said output.

20. The angled drill according to claim 19, wherein said transmission being manual.

21. The angled drill according to claim 20, wherein said transmission is a two-speed transmission.

22. The angled drill according to claim 20, wherein an activation member is on said housing for moving said transmission between different setting positions.

23. The angled drill according to claim 22, wherein said housing has a top portion, bottom portion, and two side portions and said activation member being on one of said portions.

24. The angled drill according to claim 20, wherein said motor activation device and said transmission activation member can be activated by a single hand of a user.

25. The angled drill according to claim 17, wherein said transmission has two stage planetary gear train and a bevel gear set, one of said bevel gears coupling with said output.

* * * * *